United States Patent
Landry et al.

(10) Patent No.: US 7,356,086 B1
(45) Date of Patent: Apr. 8, 2008

(54) POWER LINE COUPLER ADAPTED FOR USE WITH MULTIPLE SERVICE PANELS

(75) Inventors: James F. Landry, Germantown, MD (US); Andrew Pozsgay, Germantown, MD (US)

(73) Assignee: Telkonet, Inc., Germantown, MD (US)

( * ) Notice: Subject to any disclaimer, the term of this patent is extended or adjusted under 35 U.S.C. 154(b) by 0 days.

(21) Appl. No.: 11/739,456

(22) Filed: Apr. 24, 2007

(51) Int. Cl.
*H04B 3/00* (2006.01)

(52) U.S. Cl. .................. 375/257; 340/310.01; 340/538

(58) Field of Classification Search ............... 375/130, 375/219, 222, 377, 257–258; 340/531, 538, 340/310.01, 310.07, 310.08; 455/402
See application file for complete search history.

(56) References Cited

U.S. PATENT DOCUMENTS

| | | | | |
|---|---|---|---|---|
| 4,139,735 A | * | 2/1979 | Dorfman et al. | 370/485 |
| 4,239,940 A | * | 12/1980 | Dorfman | 455/402 |
| 6,411,608 B2 | * | 6/2002 | Sharony | 370/318 |
| 6,809,633 B2 | * | 10/2004 | Cern | 375/258 |
| 6,975,212 B2 | | 12/2005 | Crenshaw et al. | |
| 2004/0227623 A1 | * | 11/2004 | Pozsgay | 340/310.01 |
| 2006/0176898 A1 | | 8/2006 | Chan et al. | |
| 2006/0222086 A1 | * | 10/2006 | Frye, Jr. | 375/257 |
| 2007/0189182 A1 | * | 8/2007 | Berkman et al. | 370/252 |

* cited by examiner

*Primary Examiner*—Khanh C. Tran
(74) *Attorney, Agent, or Firm*—Burman Y Mathis (57) ABSTRACT

Systems and methods for interfacing a power line communications (PLC)-enabled communication device in a building with a power network are disclosed. In various embodiments, a system can include a specially-configured coupler that enables a common PLC communications signal to be injected into the same power phase line of the power network, but at different service panels.

19 Claims, 12 Drawing Sheets

POWER LINE COUPLER ADAPTED FOR USE WITH MULTIPLE SERVICE PANELS

BACKGROUND

1. Technical Field

The present invention relates to power line communications (PLC) devices and systems.

2. Discussion of Related Art

The ability to interconnect computers and other intelligent devices, both internally and to the Internet, is a common requirement wherever people live and work today. The electrical connections required to form various local area network (LANs) have traditionally been accomplished by installing dedicated data wiring both inside buildings and between clusters of buildings. A number of wireless methods have also been developed and deployed to address this need.

Unfortunately, retrofitting existing buildings with special wiring can be expensive, and wireless systems are often inappropriate in high-density dwellings where excessive interference can be expected and the available bandwidth can be quickly overwhelmed. To address these problems, power line communications (PLC) technology, which allows existing electric power wiring to simultaneously transport power and high-speed data, has been realized. Unfortunately, PLC technology, while constantly improving, is often a relatively expensive to implement. Accordingly, new PLC solutions for providing less expensive yet more efficient LANs and Internet connections are desirable.

SUMMARY

In accordance with an exemplary embodiment, a system for interfacing a power line communications (PLC)-enabled communication device with a power network residing in a building is presented. The power network includes a first service panel and a second service panel, and the first service panel and the second service panel are interconnected and include at least one common phase power line of the power network. The system includes a coupling circuit that includes a primary port coupled to the communication device, a first secondary port coupled to the first service panel, and a second secondary port coupled to the second service panel. The coupling circuit is configured to receive a high-frequency broadband communication signal from the communication device, split the communication signal into two portions, inject a first portion into the common phase power line at the first service panel and inject a second portion into the common phase power line at the second service panel.

In accordance with another exemplary embodiment, a system for interfacing a power line communications (PLC)-enabled communication device with a power network residing in a building is presented. The power network includes a first service panel and a second service panel, and the first service panel and the second service panel are interconnected and include at least one common phase power line of the power network. The system includes a broadband communications device, and a coupling means coupled to the communications device for interconnecting the communications device with the common phase power line at both the first service panel and the second service panel.

In accordance with yet another exemplary embodiment, a method for using a power network residing in a building for power line communications includes transmitting a broadband communications signal, splitting the broadband communications signal into at least a first portion and a second portion, injecting the first portion into a first phase line of the power network at a first service panel of the power network, and injecting the second portion into the first phase line of the power network at a second service panel of the power network.

DETAILED DESCRIPTION

The disclosed methods and systems will now be described more fully hereinafter with reference to the accompanying drawings, in which preferred embodiments of the invention are shown. The disclosed methods and systems may, however, be embodied in many different forms and should not be construed as being limited to the embodiments set forth herein. Rather, these embodiments are provided so that this disclosure will convey the scope of the invention to those skilled in the art. In the drawings, like reference numbers refer to like elements throughout the specification.

Figure 1:
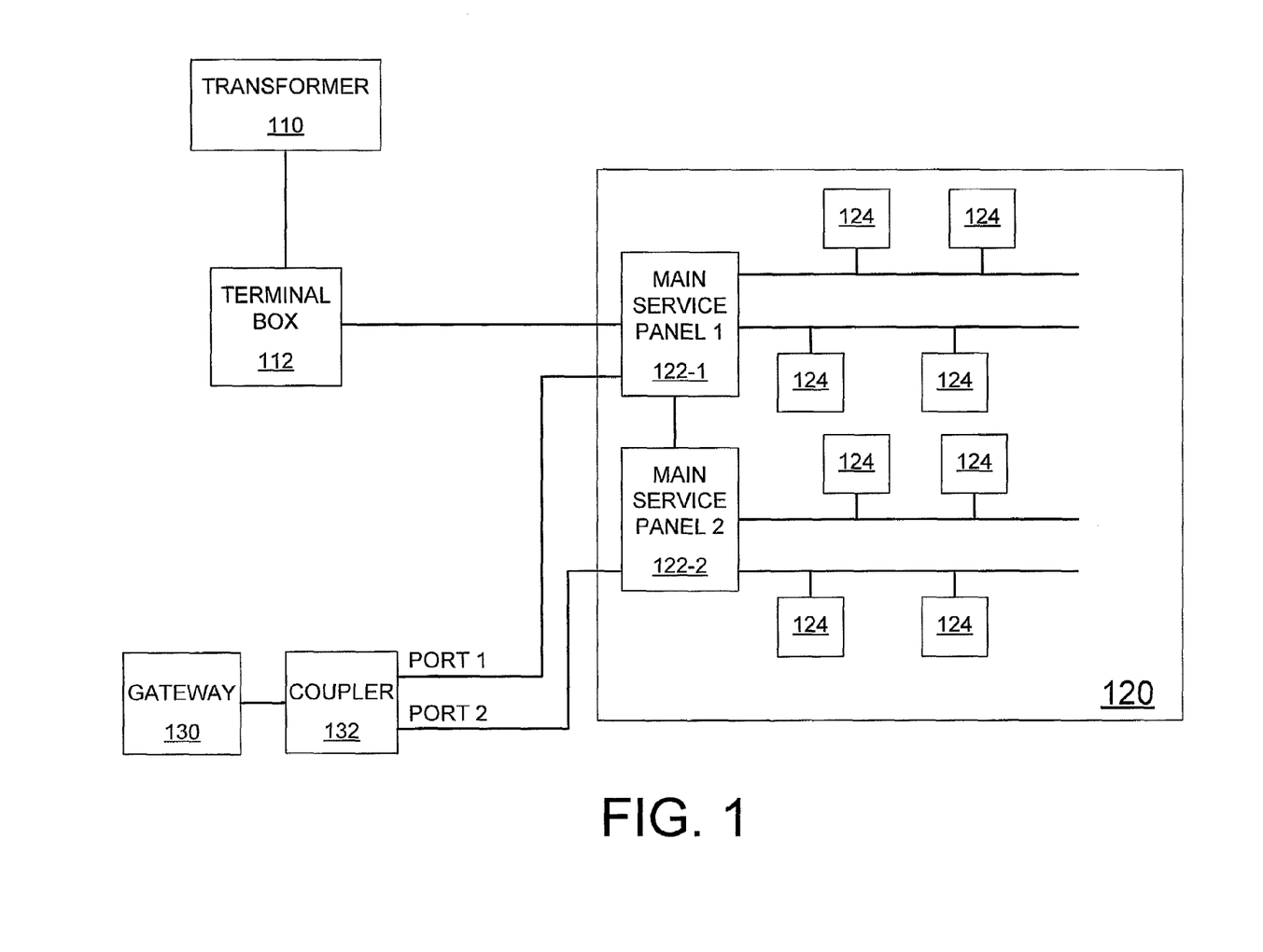
FIG. 1 is a block diagram of a power line communications system for a building that uses a low-voltage power network.

FIG. 1 is a block diagram of a power line communications system for a building using a low-voltage power network. As shown in FIG. 1, the power network can include a transformer 110 coupled to a terminal box 112 via a network of power lines. The power lines of the power line network may extend from the terminal box 112 to two "main" service panels 122-1 and 122-2 via one or more optional power meters (not shown). From the main service panels 122-1 and 122-2, power may be distributed to various PLC-enabled high-frequency terminals 124 residing within the building 120.

Note that while two service panels 122-1 and 122-2 are depicted in the example of FIG. 1, in various embodiments the methods and systems of this disclosure may be adapted for use with any number of service panels. Further, while the exemplary power network is not specified in FIG. 1, the methods and systems of the present disclosure may be used with any number of power networks, such as a single-phase network, a dual-phase network, and a Wye or delta three-phase network.

Still further, while the present disclosure has particular advantage for systems having multiple main (or primary) service panels, it should be appreciated that the methods and systems may also have particular use for multiple co-located secondary panels, secondary panels located in different areas, or a combination of main/primary and secondary panels.

As is also depicted in FIG. 1, a gateway 130 connected to an Internet service provider (not shown) can be electrically coupled to a coupler 132 via a coaxial cable, wireless network or any other number of known or later-developed means. The coupler 132, in turn, can be electrically coupled to each of the service panels 122-1 and 122-2 via two separate ports, PORT 1 and PORT 2.

In operation, the transformer 110, terminal box 112 and service panels 122-1 and 122-2 can distribute electrical power throughout the dwelling 120. As power is consumed by various devices (not shown) within the dwelling, the gateway 130 can provide a number of communication services for the various terminals 124. For example, in various embodiments the gateway 124 can act as a hub in a hub-and-spoke topology local area network (LAN), thus enabling terminals on the branch lines of service panels 122-1 and 122-2 to readily communicate with one another. Further, the gateway 110 can provide Internet access for the various terminals and/or provide access to distant LANs, storage devices and so on.

Note that for the present example, the service panels 122-1 and 122-2 can be remote from one another or closely co-located. Also note that either of both of the service panels 122-1 and 122-2 can take the form of multiple sub-panels. For example, for embodiments using a Wye three-phase power network, each of service panels 122-1 and 122-2 may be divided into three sub-panels for a total of six main panels.

Further note that while the exemplary building 120 is a garden-style apartment or some other structure that is typically known to use three-phase power, in other embodiments the building 120 can be any form of commercial or residential structure.

While the exemplary powerline-based protocol used by gateway 130 is an OFDM-based LAN broadband protocol known as Homeplug® developed by Intellon Corporation of Ocala, Fla. (United States), the particular protocol can vary from embodiment to embodiment to use any known or later developed PLC-based communication standards, as well as any other capable communication standard developed for other media, such as HomePNA® which was developed for broadband communications over telephony/POTS twisted-wire pairs. Still further, in addition to LAN signals, the coupler 132 may pass on non-LAN signals, such as any number of DSL or other WAN signals.

Figure 2:
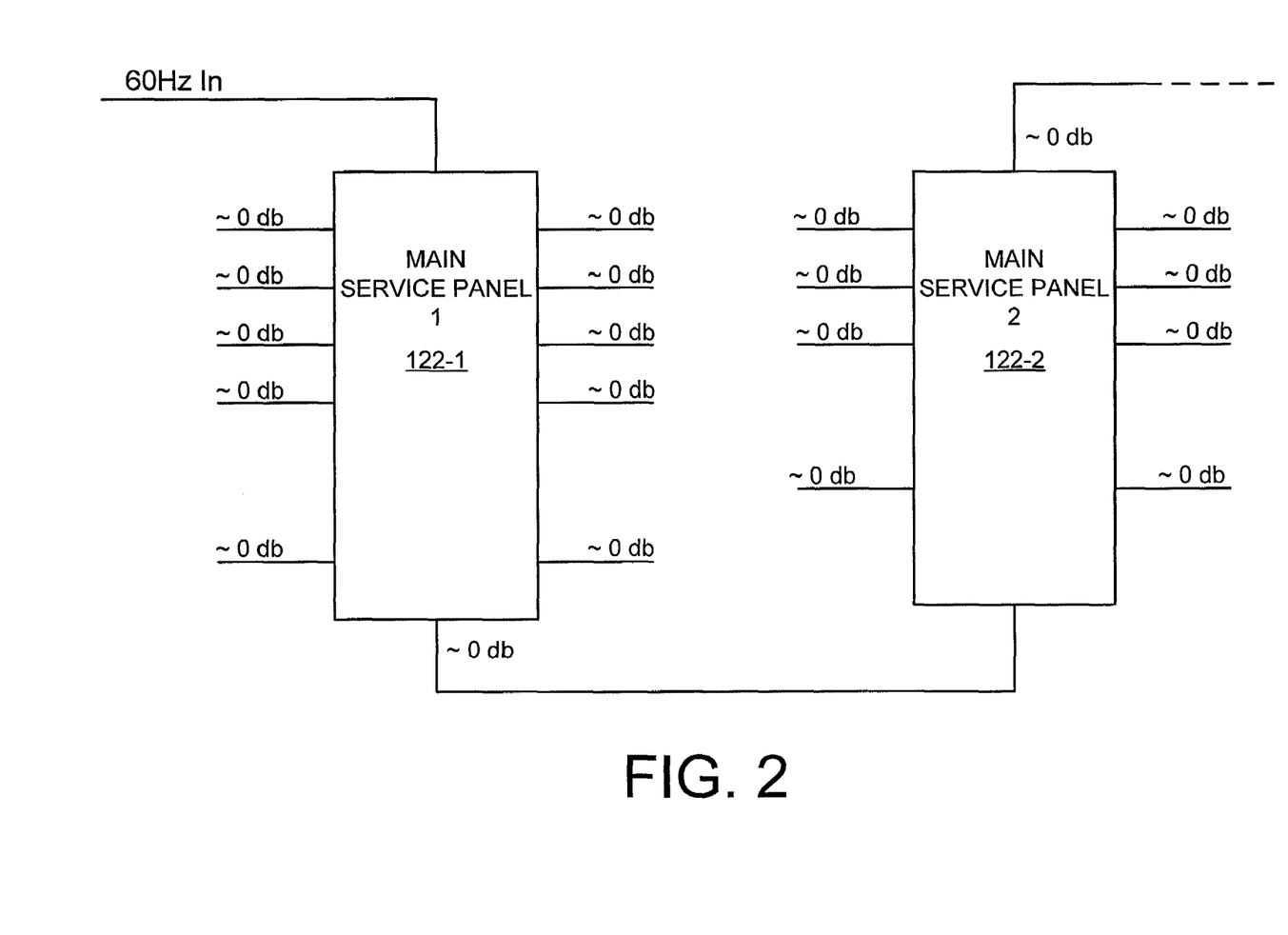
FIG. 2 is a block diagram depicting the attenuation of 50 Hz/60 Hz power signals for an electrical power network having multiple service panels.

FIG. 2 is a block diagram depicting the attenuation of 50 Hz/60 Hz power signals for an electrical power network having multiple service panels. As shown in FIG. 2, a single-phase 60 Hz power signal is fed to the main service panel 122-1 via a top entry port whereupon power may be forwarded to the second main service panel 122-2 via a bottom entry port of both service panels 122-1 and 122-2. As is suggested in FIG. 2, the attenuation of all 60 Hz power exiting both service panels 122-1 and 122-2 should be close to −0 db. That is, for low-frequency signals, the attenuation caused by a service panel should be substantially non-existent assuming that all electrical connections with the service panels 122-1 and 122-2 are sound.

Figure 3:
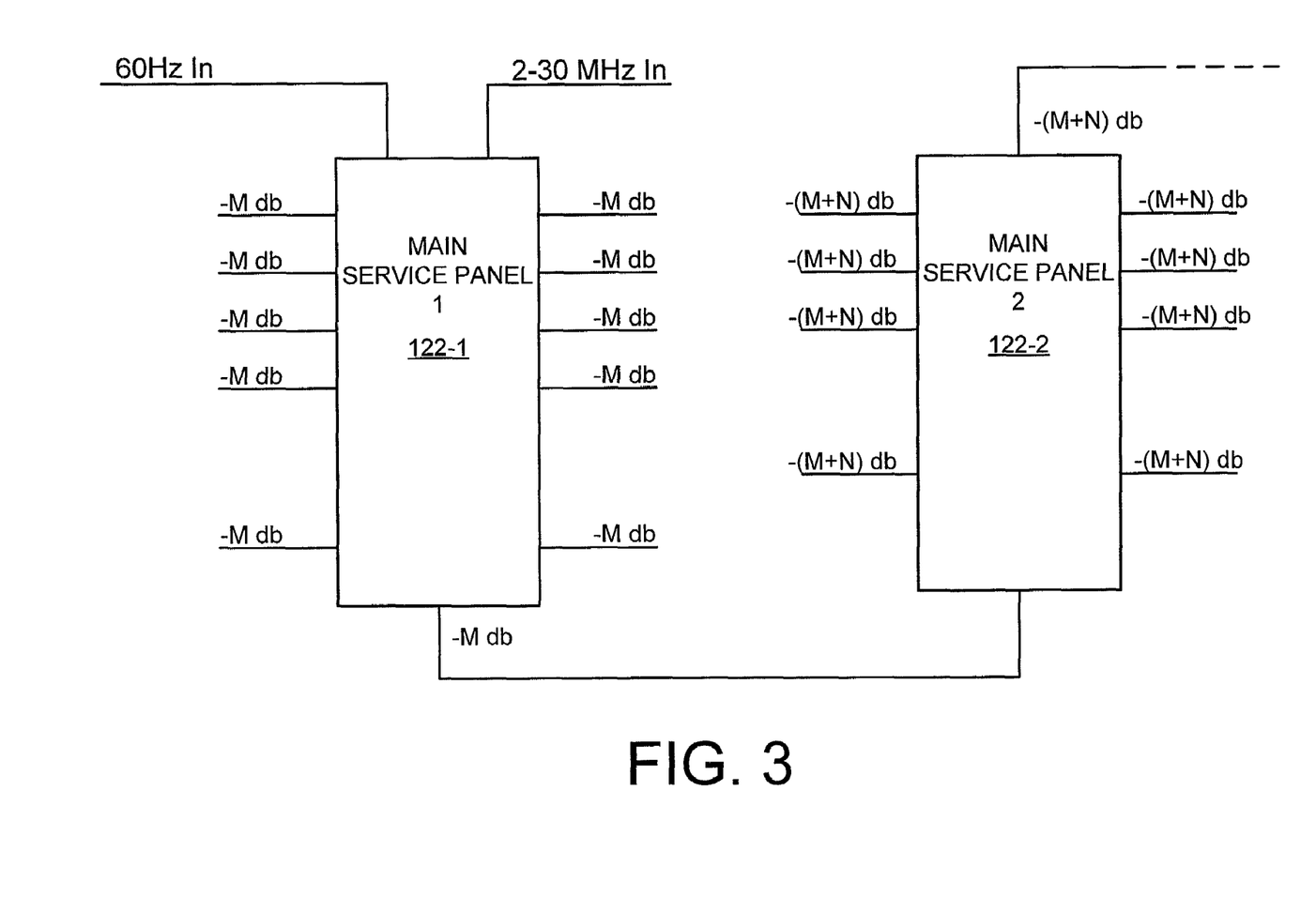
FIG. 3 is a block diagram depicting the attenuation pattern of high-frequency broadband communication for an electrical power network having multiple service panels.

FIG. 3 is a block diagram depicting the attenuation pattern of high-frequency broadband communication signals for the multi-panel power network of FIG. 2. As shown in FIG. 3, a single-phase 60 Hz power signal can be fed to the main service panel 122-1 via a first top entry port, and a high-frequency broadband communication signal can be fed to the main service panel 122-1 via a second top entry port. As with the network of FIG. 2, 60 Hz power may be forwarded to the second main service panel 122-2 via a bottom entry port of both service panels 122-1 and 122-2. In addition to the 60 Hz power, the high-frequency broadband communication signals may also be supplied from the first service panel 122-1 to the second service panel 122-2 via the bottom entry ports.

As is suggested in FIG. 3, the attenuation of the high-frequency broadband communication signals exiting each service panel 122-1 and 122-2 undergoes a substantially different attenuation pattern than the attenuation for the 60 Hz power signals of FIG. 2. That is, for high-frequency signals, the attenuation caused by a service panel should be substantially akin to that of a classic RF splitter with some amount of additional loss. Accordingly, the strength of high-frequency broadband communication signals exiting the second service panels 122-2 may be orders of magnitude below the strength of high-frequency broadband communication signals exiting the first service panel 122-1. For example, assuming that the attenuation M of the first service panel 122-1 is M=30 db while the attenuation N of the second service panel 122-2 is N=50 db, any broadband signals injected into the top of the first service panel 122-1 will be attenuated at least 80 db when leaving the second service panel 122-2. Such an attenuation may seriously impede effective communication.

Figure 4:
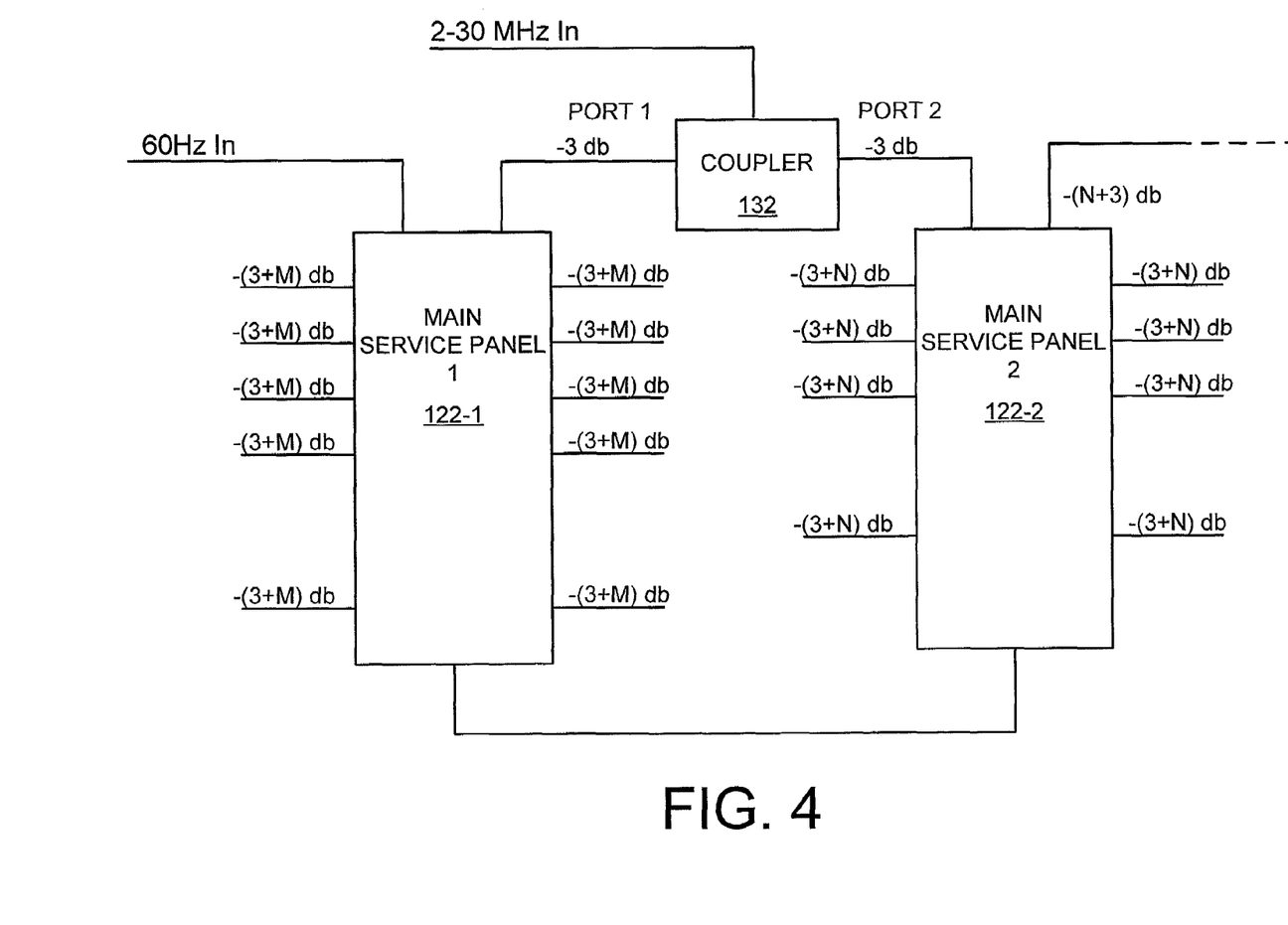
FIG. 4 is a block diagram depicting a system having an improved attenuation pattern of high-frequency broadband communication for an electrical power network having multiple service panels.

FIG. 4 is a block diagram depicting a system having an improved attenuation pattern of high-frequency broadband communication for an electrical power network having multiple service panels. As with FIGS. 2 and 3, the 60 Hz power signal can be fed to the first service panel 122-1 via a first top entry port and to the second main service panel 122-2 via a bottom entry port of both service panels 122-1 and 122-2.

However, in contrast to FIG. 3, the high-frequency broadband communication signals do not follow the same path as power. To the contrary, high-frequency broadband communication signals may be first supplied to a coupler 132, which may split the received high-frequency broadband communication signals in to two substantially equal portions. In turn, each of the split portions may be fed to a separate service panel 122-1 or 122-2. As a result, the attenuation of high-frequency broadband communication signals exiting from both service panels 122-1 and 122-2 may be more balanced. For example, using the example above where M=30 db and N=50 db, and assuming that the attenuation out of the coupler 132 is 3 db, communication signals exiting the first panel 122-1 may be attenuated 33 db while communication signals exiting the second panel 122-2 may be attenuated 53 db.

While the example of FIG. 3 shows a coupler configured to split a communication signal into two portions, in various embodiments coupler 132 may be configured to split a communication signal into any number of portions for any number of panels. Further, while the example of FIG. 3 shows a coupler configured to split a communication signal into equal (−3 db) portions, in various embodiments the apportionment of signal strength for coupler 132 may changed to accommodate the difference in attenuation between service panels. For example, assuming that the attenuation of the first service panel 122-1 (−M db) is substantially less than the attenuation of the second service panel 122-2 (−N db), the coupler 132 may be configured to provide a greater portion of the split communication signal to the second service panel 122-2 in order to cause the signal strength of communication signals exiting the service panels 122-1 and 122-2 to be roughly equal.

Figure 5A:
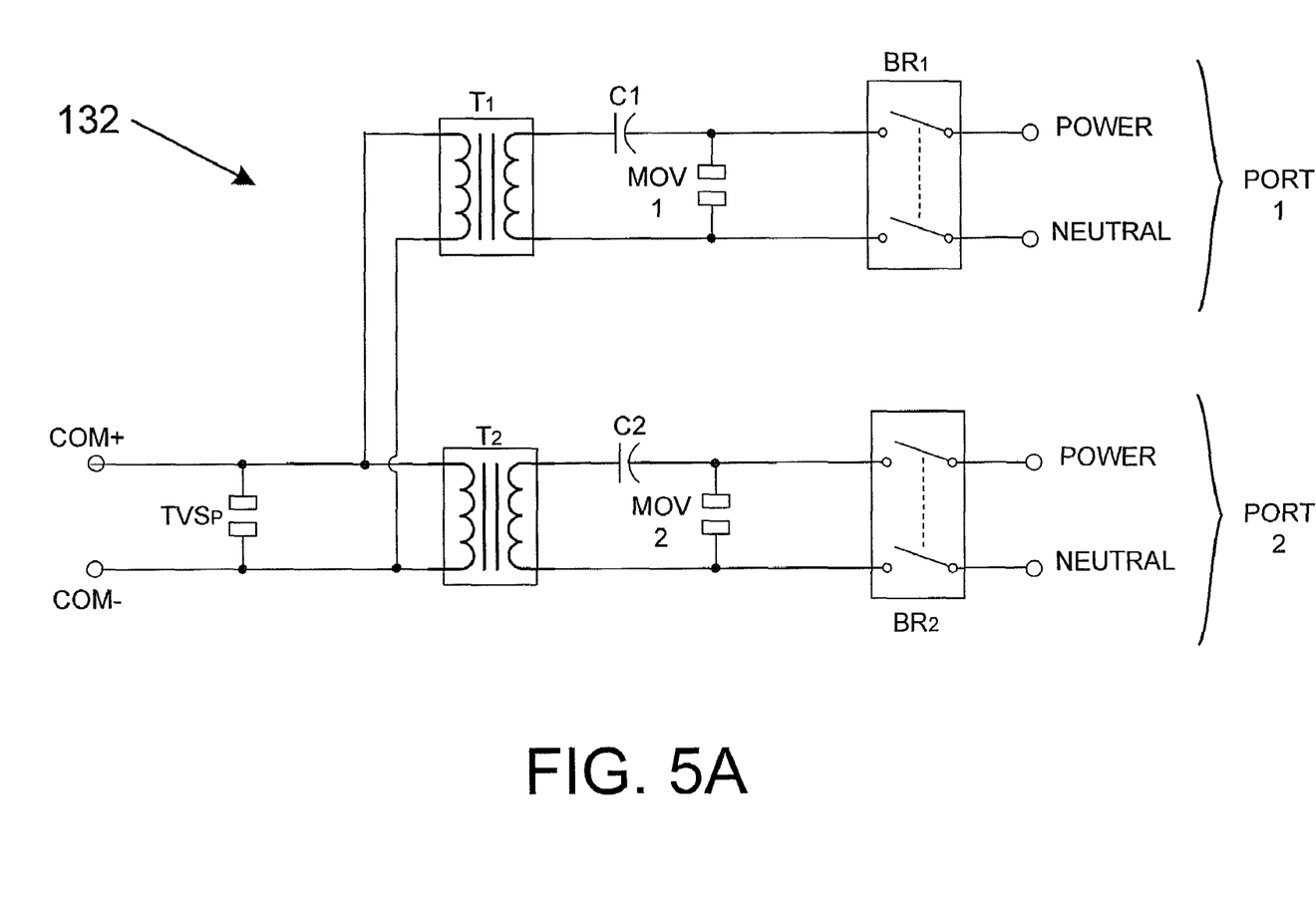
FIG. 5A is a schematic of a first single-phase coupler for use in the system of FIG. 5.

FIG. 5A is a schematic diagram of an exemplary embodiment of a coupler 132 adapted for use with a single-phase power system having two service panels. Starting from the left-hand side of FIG. 2, a pair of communications lines COM+ and COM− capable of carrying one or more broadband communication signals, such as the HomePlug® standard signal discussed above, can be coupled to the primary sides of a pair of high-frequency/broadband balun transformers $T_1$ and $T_2$ in a parallel fashion. An optional transient voltage suppressor $TVS_P$, may be placed between the communications lines COM+ and COM− to handle voltage spikes that may be cause by outside conditions, such as lightening strikes.

Continuing, a first capacitor $C_1$ can couple the top terminal of the secondary side of transformer $T_1$ and a first (optional) resettable breaker $BR_1$, which in turn may provide electrical continuity to a first service panel using the PORT 1 terminal discussed above with respect to FIG. 1. Similarly, a second capacitor $C_2$ can couple the top terminal of the secondary side of transformer $T_2$ and a second (optional) resettable breaker $BR_2$, which in turn can provide electrical continuity to a second service panel using the PORT 2 terminal discussed above with respect to FIG. 1. Note that metal oxide varistors $MOV_1$ and $MOV_2$ may be provided to protect against transient voltage spikes.

In operation, communication signals passing through the COM+ and COM− lines can be split into two portions using transformers $T_1$ and $T_2$. The split communication signal from transformer $T_1$ can then propagate to PLC-enable terminals coupled to a first service panel coupled to PORT 1. Similarly, the split communication signal from transformer $T_2$ can then propagate to PLC-enable terminals coupled to a second service panel coupled to PORT 2.

Similarly, communication signals originating from PLC-enabled terminals may propagate (right to left) though their respective breakers $BR_1$ or $BR_2$, capacitors $C_1$ or $C_2$, and transformers $T_1$ or $T_2$ to the COM+ and COM− lines, which then may be passed to a communications device, such as a gateway and/or a LAN hub.

Figure 5B:
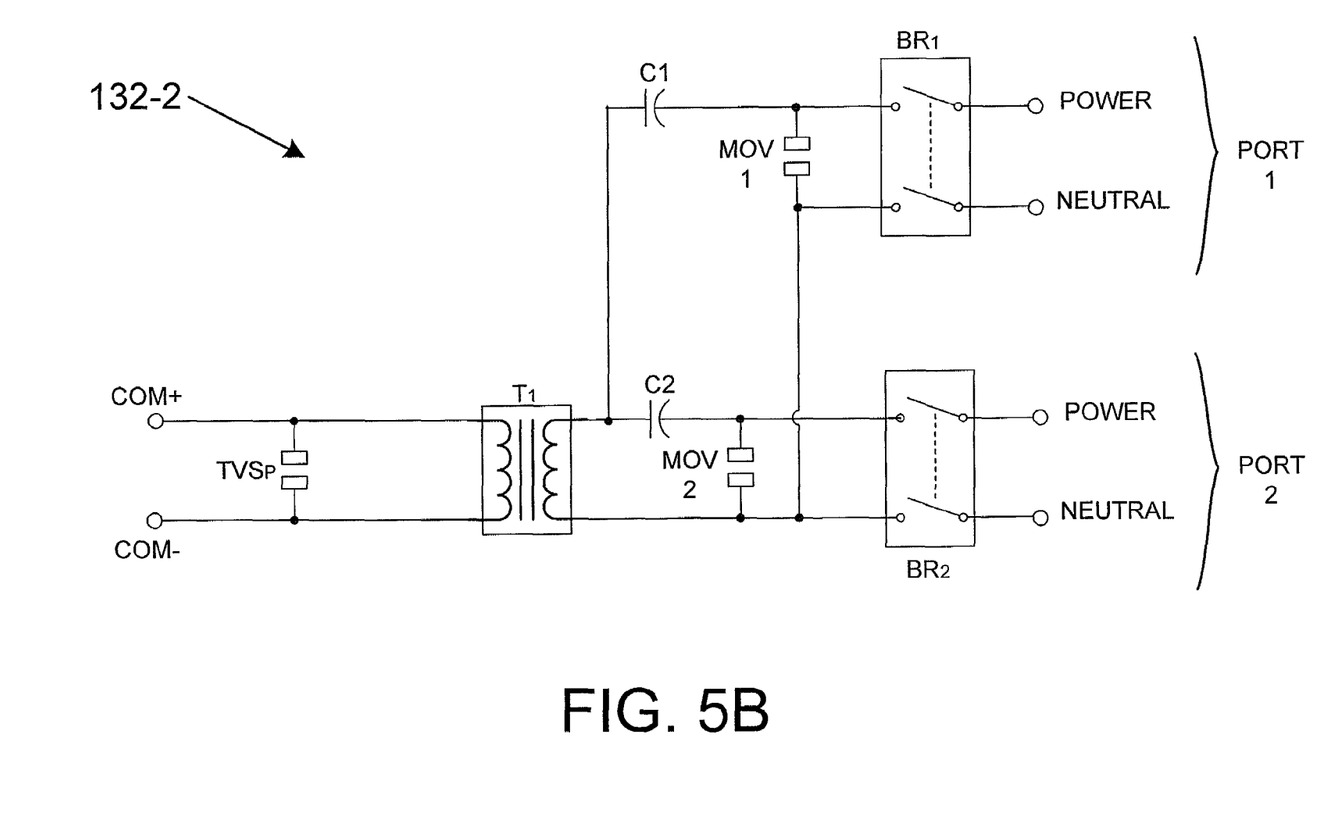
FIG. 5B is a schematic of a second single-phase coupler for use in the system of FIG. 5.

FIG. 5B is a schematic diagram of an exemplary embodiment of a second coupler 132-2 adapted for use with a single-phase power system having two service panels. As shown in FIG. 5B, the second coupler 132-2 uses a single transformer $T_1$, rather than the dual-transformer approach of FIG. 5A, but otherwise works in a similar fashion.

In operation, communication signals passing through the COM+ and COM− lines can be passed through transformer $T_1$ to be split into two portions at capacitors $C_1$ and $C_2$. The split communication signals can then propagate to PLC-enable terminals coupled to a first service panel via breakers $BR_1$/PORT 1 and to a second service panel via breakers $BR_2$/PORT 2.

Similarly, communication signals originating from PLC-enabled terminals may propagate (right to left) though their respective breakers $BR_1$ or $BR_2$, combined at the junction between the capacitors $C_1$ or $C_2$ and transformer $T_1$, then passed to the COM+ and COM− lines.

While the second coupler 132-2 of FIG. 5B may represent a less expensive alternative to the coupler 132 of FIG. 5A, it should be appreciated that the general architecture of FIG. 5A may be better suited in splitting a communication signal derived from the COM+ and COM− lines into unequal portions. For example, by using a first transformer $T_1$ having substantially different number of primary windings than the second transformer $T_2$, the ratio of output signals strength between transformers $T_1$ and $T_2$ may be adjusted.

While the embodiments of FIGS. 5A and 5B are designed to address a single-phase power network, the methods and systems of the present embodiment may be extended to other electrical distribution networks.

Figure 6A:
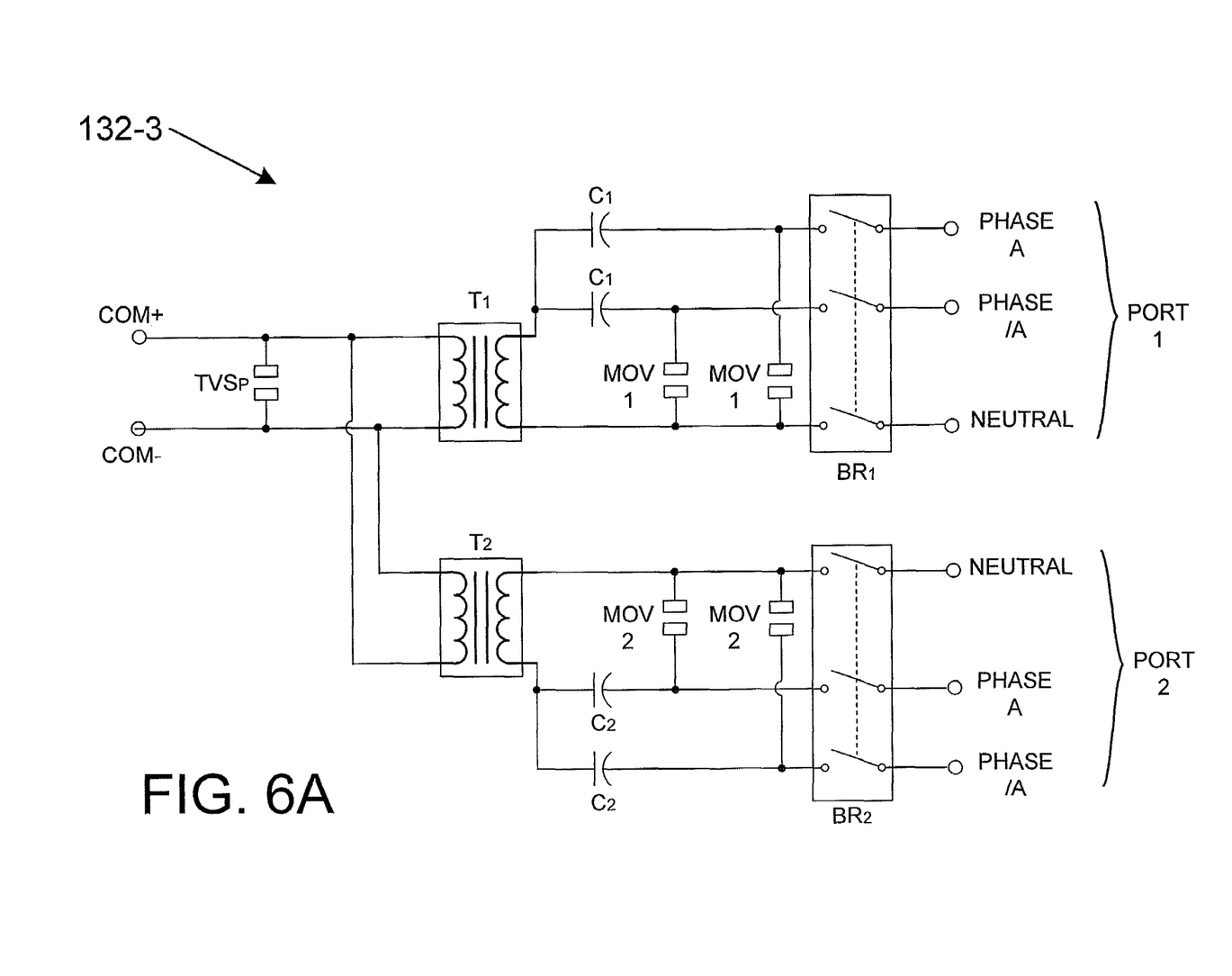
FIG. 6A is a schematic of a first dual-phase coupler for use in the system of FIG. 5.

For example, continuing to FIG. 6A, an exemplary embodiment of another communication coupler 132-3 is shown for a two-phase power network. As shown in FIG. 6A, the communication coupler 132-3 is similar to that depicted in FIG. 5A, but has two first capacitors $C_1$ and two second capacitors $C_2$ to respectively couple transformer $T_1$ and transformer $T_2$ with the PHASE A and PHASE /A power lines at breakers $BR_1$ and $BR_2$. Additionally, two metal oxide varistors $MOV_1$ and $MOV_2$ may be provided to protect against transient voltage spikes.

Figure 6B:
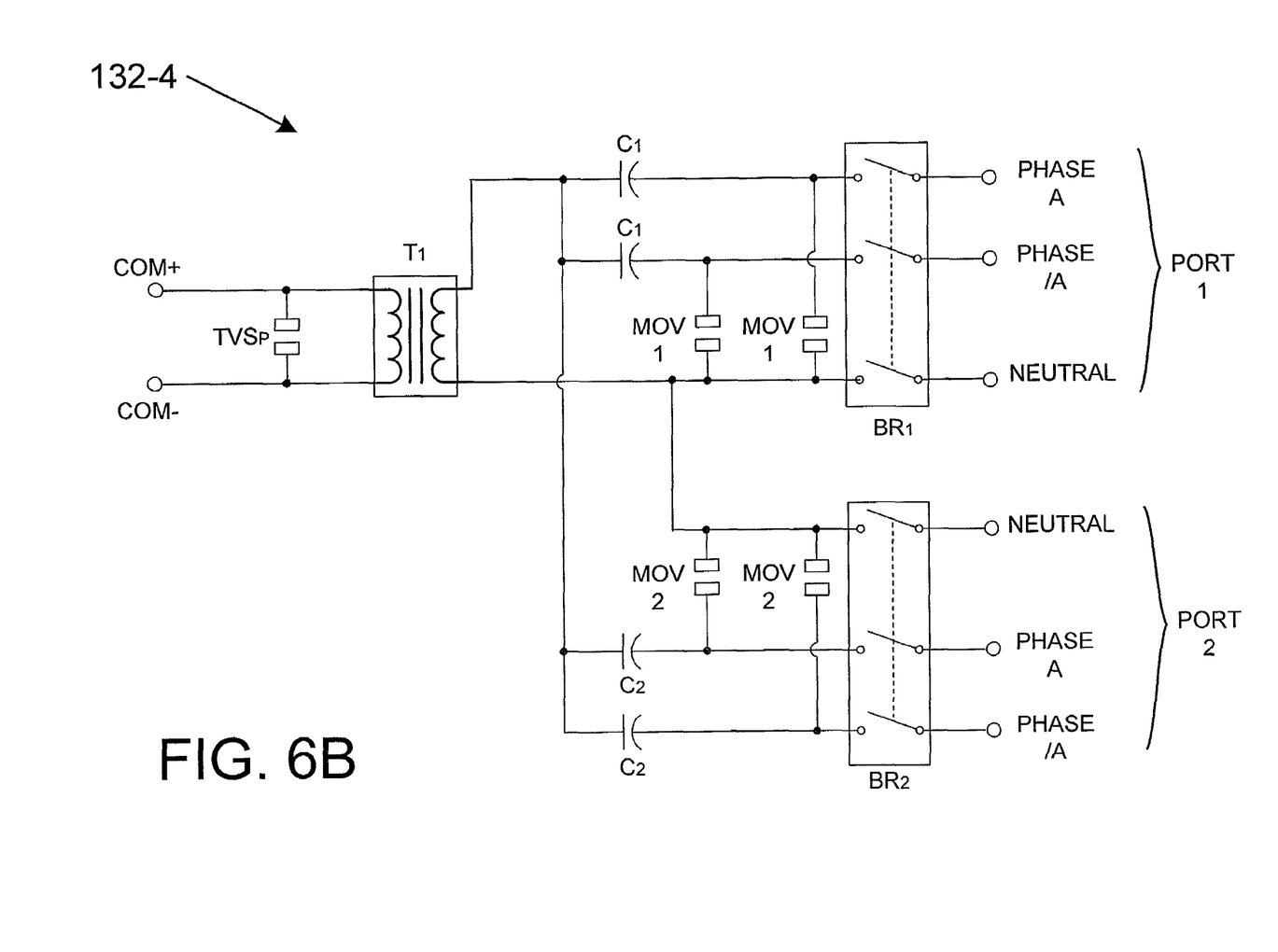
FIG. 6B is a schematic of a second dual-phase coupler for use in the system of FIG. 5.

FIG. 6B depicts another exemplary communication coupler 132-4 for a two-phase power network. As shown in FIG. 6B, the communication coupler 132-4 is similar to that depicted in FIG. 5B, but has two first capacitors $C_1$ and two second capacitors $C_2$ to respectively couple transformer $T_1$ and transformer $T_2$ with the PHASE A and PHASE /A power lines at breakers $BR_1$ and $BR_2$. As with FIG. 6A, two metal oxide varistors $MOV_1$ and $MOV_2$ may be provided to protect against transient voltage spikes.

Similar to the coupler 132-2 of FIG. 5B, the coupler 132-4 of FIG. 6B may represent a less expensive alternative to the coupler 132-3 of FIG. 6A. However, again it should be appreciated that the general architecture of FIG. 6A may be better suited in splitting a communication signal derived from the COM+ and COM− lines into unequal portions.

Figure 7A:
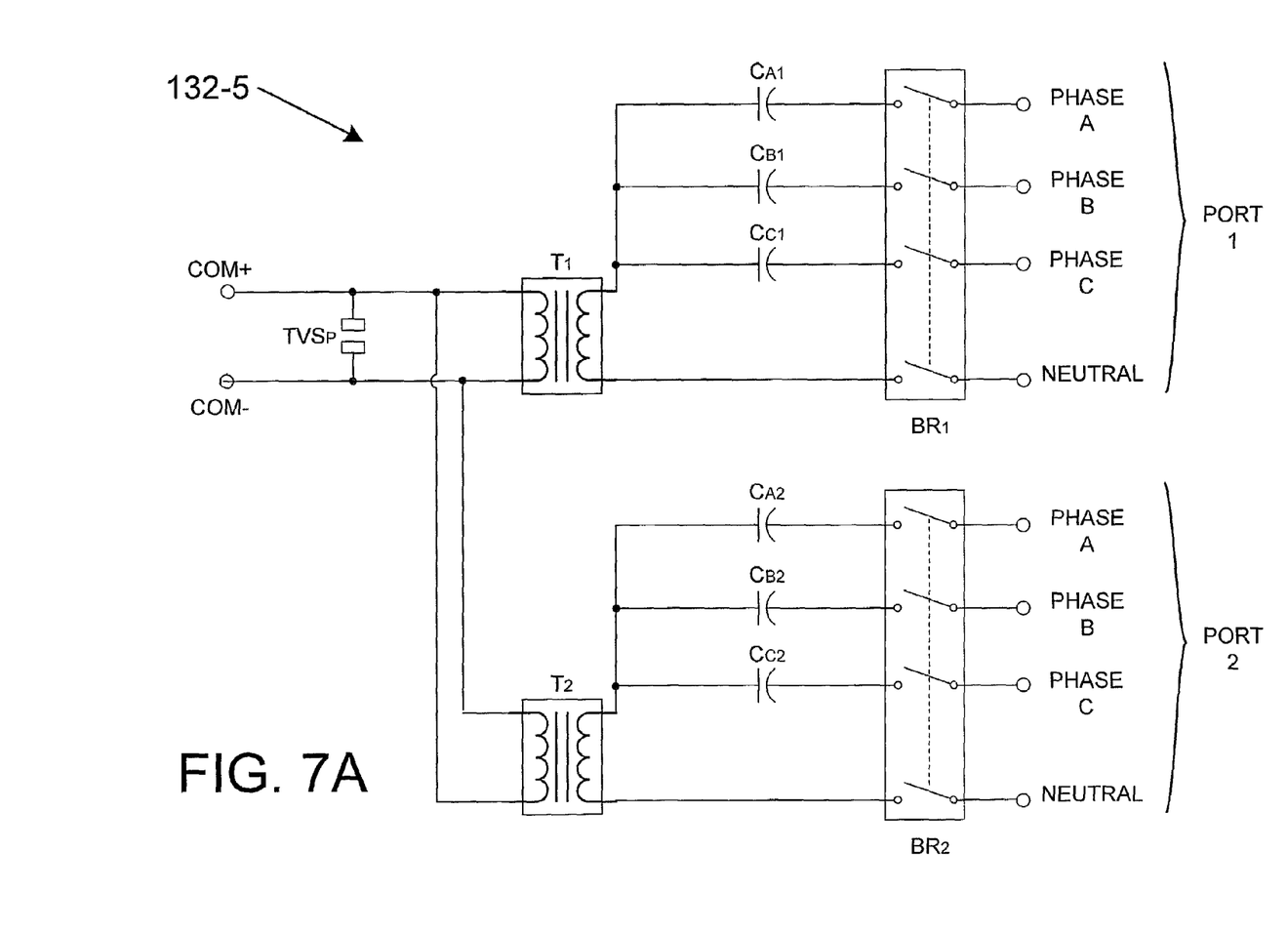
FIG. 7A is a schematic of a first three-phase coupler for use in the system of FIG. 5.

Continuing to FIG. 7A, an exemplary embodiment of another high-communication coupler 132-5 is shown for a three-phase power network. As shown in FIG. 7A, the second communication coupler 132-3 is similar to that depicted in FIG. 6A, but has three first capacitors $C_1$ and three second capacitors $C_2$ to respectively couple transformer $T_1$ and transformer $T_2$ with the PHASE A, PHASE B and PHASE C power lines at breakers $BR_1$ and $BR_2$. Additionally, three metal oxide varistors (not shown) may be provided to protect against transient voltage spikes.

Figure 7B:
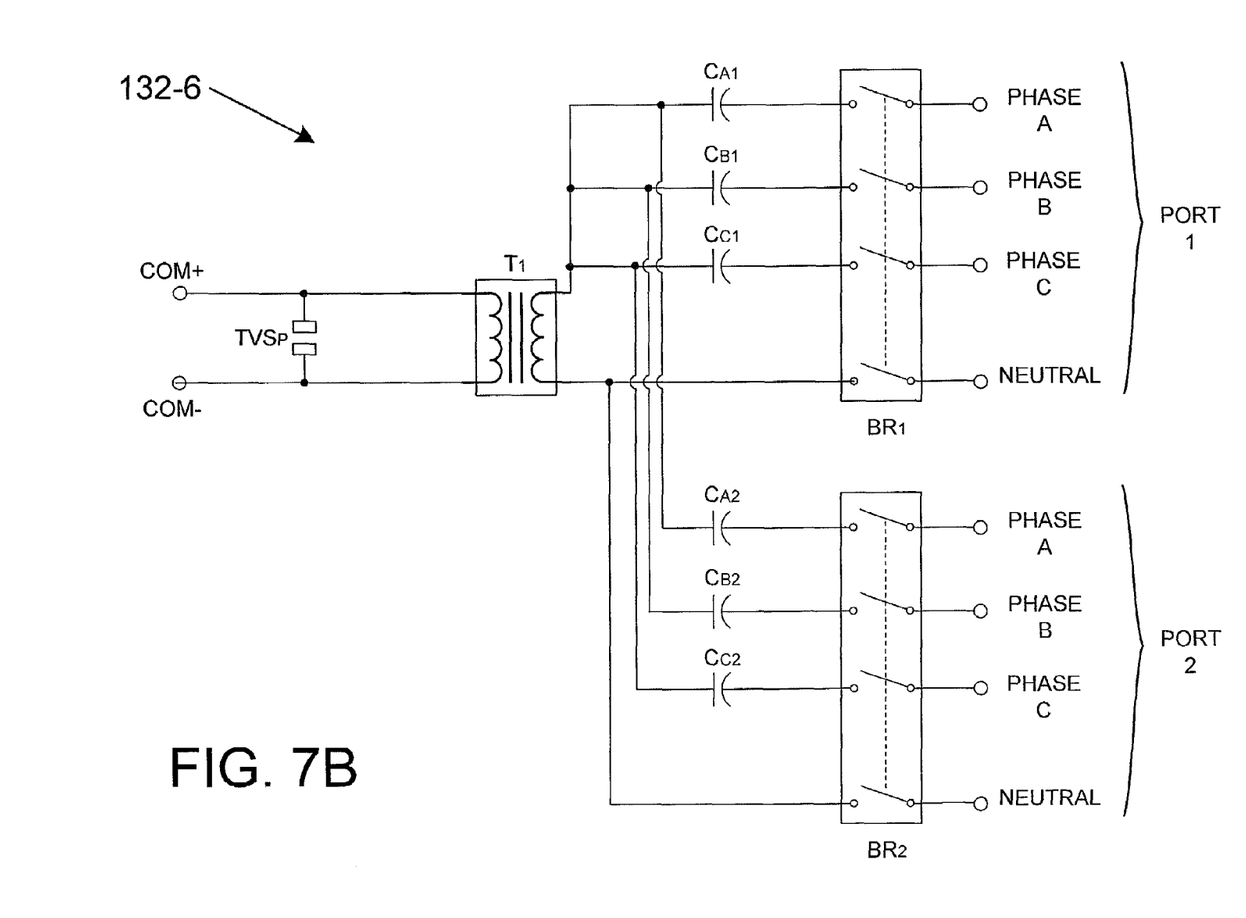
FIG. 7B is a schematic of a second three-phase coupler for use in the system of FIG. 5.

Next, FIG. 7B depicts another exemplary communication coupler 132-6 for a two-phase power network. As shown in FIG. 7B, the communication coupler 132-6 is similar to that depicted in FIG. 6B, but has three first capacitors $C_1$ and three second capacitors $C_2$ to respectively couple transformer $T_1$ and transformer $T_2$ with the PHASE A, PHASE B and PHASE C power lines at breakers $BR_1$ and $BR_2$. Again, three metal oxide varistors (not shown) may be provided to protect against transient voltage spikes.

Figure 8:
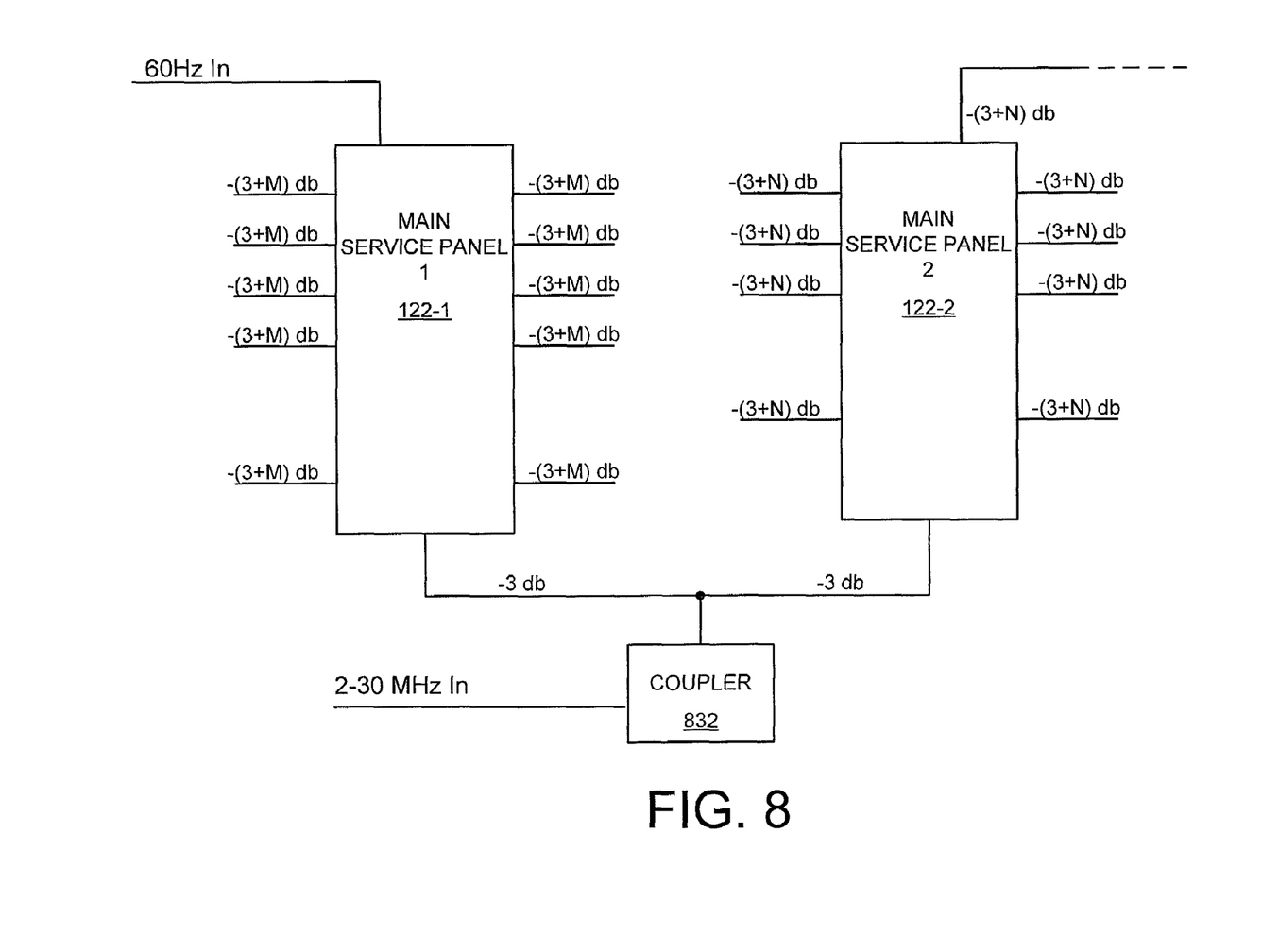
FIG. 8 is a block diagram depicting a second system having an improved attenuation pattern of high-frequency broadband communication for an electrical power network having multiple service panels.

FIG. 8 is a block diagram depicting the attenuation pattern of high-frequency broadband communication signals for the multi-panel power network of FIG. 2 using a second approach, i.e., by coupling a gateway or hub to a common electrical wire coupled between both service panels 122-1 and 122-2. As shown in FIG. 8, an appropriately placed coupler 832 may split a high-frequency communications signal into two portions. Assuming that the distance from coupler 823 to each service panel 122-1 and 122-2 is about the same, then each of the service panels 122-1 and 122-2 should receive communication signal of roughly equal strength. However, it should be appreciated that by moving the coupler 823 closer to one of the service panels 122-1 or 122-2, the signal strength may be unequally divided. An advantage to using the approach of FIG. 8 is that hardware may be substantially minimized. However, a disadvantage may arise in that tapping into intermediate power wires may not be easy as such power wires tend to be inaccessible.

Figure 9:
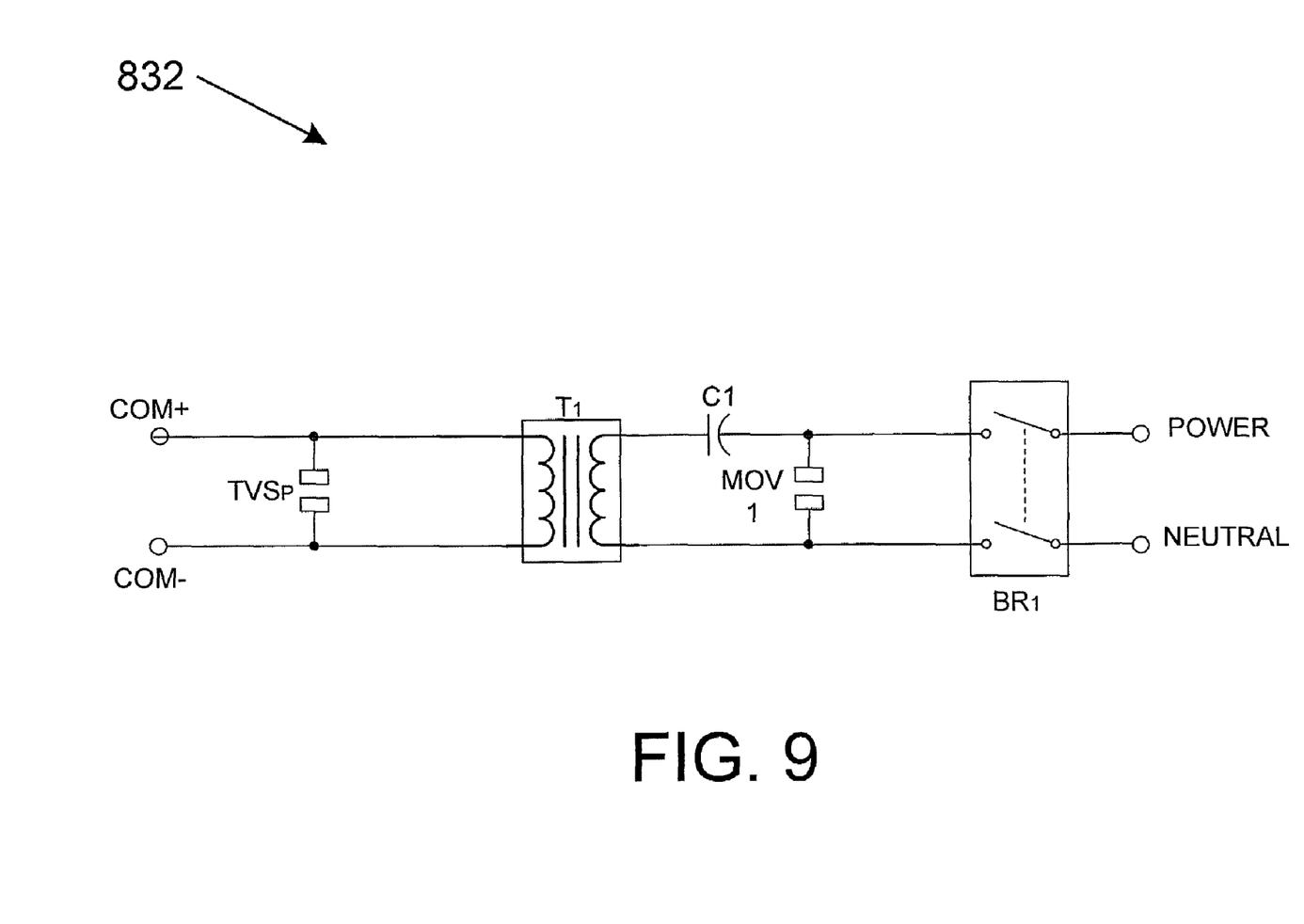
FIG. 9 is a schematic of a coupler for use in the system of FIG. 8.

FIG. 9 is a schematic diagram of an exemplary embodiment of a coupler 832 adapted for use with the single-phase power system and service panel configuration of FIG. 8. As shown in FIG. 9, the configuration of coupler 832 is similar to the coupler 132 of FIG. 5A but with a single transformer $T_1$, capacitor $C_2$, resettable breaker $BR_1$, and metal oxide varistor $MOV_1$.

In operation, communication signals passing through the COM+ and COM– lines can be passed through the transformer $T_1$, capacitor $C_2$, and resettable breaker $BR_1$ to be split at a location to the right of breaker $BR_1$. The split communication signal can then propagate to multiple service panels, and further propagate to PLC-enable terminals coupled to such service panels. Similarly, remote signals derived from the PLC-enable terminals may propagate (right-to-left) from breaker $BR_1$ to the COM+ and COM– lines.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communication services.

The many features and advantages of the disclosed methods and systems are apparent from the detailed specification, and thus, it is intended by the appended claims to cover all such features and advantages of the invention which fall within the true spirit and scope of the disclosed methods and systems. Further, since numerous modifications and variations will readily occur to those skilled in the art, it is not desired to limit the disclosed methods and systems to the exact construction and operation illustrated and described, and accordingly, all suitable modifications and equivalents may be resorted to, falling within the scope of the disclosed methods and systems. The scope of the claims, therefore, should be accorded the broadest interpretation so as to encompass all such modifications and similar arrangements.

What is claimed is:

1. A system for interfacing a power line communications (PLC)-enabled communication device with a power network residing in a building, wherein the power network includes a first service panel and a second service panel, and wherein the first service panel and the second service panel are interconnected and include at least one common phase power line of the power network, the system comprising:
a coupling circuit that includes a primary port coupled to the communication device, a first secondary port coupled to the first service panel, and a second secondary port coupled to the second service panel, wherein the coupling circuit is configured to receive a high-frequency broadband communication signal from the communication device, split the communication signal into two portions, inject a first portion into the common phase power line at the first service panel and inject a second portion into the common phase power line at the second service panel.

2. The system of claim 1, wherein the first service panel and the second service panel are generally co-located main service panels.

3. The system of claim 1, wherein the first service panel and the second service panel are secondary service panels.

4. The system of claim 1, wherein the first service panel and the second service panel are generally co-located secondary service panels.

5. The system of claim 1, wherein the coupling circuit is configured to split the communication signal into two substantially equal portions.

6. The system of claim 1, wherein the coupling circuit is a passive device.

7. The system of claim 6, wherein the coupling circuit includes a transformer with multiple capacitors coupled to a secondary side of the transformer.

8. The system of claim 7, wherein the coupling circuit includes two transformers, each transformer being coupled to a respective service panel via at least one capacitor.

9. The system of claim 1, wherein a first capacitor couples the first secondary side to the common power phase line at the first service panel, and a second capacitor couples the second secondary side to the common power phase line at the second service panel.

10. The system of claim 9, wherein the coupling circuit includes at least one breaker configured to electrically isolate or connect the first capacitor with the first service panel.

11. The system of claim 9, herein the communication device is configured to operate as a hub for a hub-and-spoke PLC local area network (LAN).

12. The system of claim 9, wherein coupling circuit is configured to split a single communication signal into six separate portions with each portion injected onto a power line.

13. A system for adapting a power network residing in a building to transfer power line communication (PLC) signals, wherein the power network includes a first service panel and a second service panel, and wherein the first service panel and the second service panel are interconnected and include at least one common phase power line of the power network, the system comprising:
a broadband communications device; and
a coupling means coupled to the communications device for interconnecting the communications device with the common phase power line at both the first service panel and the second service panel, wherein the coupling means is configured to split a single communication signal into at least two separate portions with each portion injected onto a power line.

14. The system of claim 13, wherein the coupling means is configured to split the single communication signal into six separate portions.

15. The system of claim 13, wherein the first and second service panels are both main service panels.

16. The system of claim 13, wherein the first and second service panels are both secondary service panels.

17. The system of claim 13, wherein the first and second service panels are both secondary service panels located at different areas of the building.

18. A method for using a power network residing in a building for power line communications (PLC), comprising;

receiving a broadband communications signal;

splitting the broadband communications signal into at least a first portion and a second portion of generally equal portions;

injecting the first portion into a first phase line of the power network at a first service panel of the power network; and injecting the second portion into the first phase line of the power network at a second service panel of the power network.

19. The method of claim 18, wherein the first and second service panels are both main service panels.

* * * * *